United States Patent
Gits et al.

(10) Patent No.: US 8,792,912 B2
(45) Date of Patent: Jul. 29, 2014

(54) SYSTEM AND METHOD FOR PROVIDING PROXIMITY-BASED DYNAMIC CONTENT IN A NETWORK ENVIRONMENT

(75) Inventors: Peter Michael Gits, Mayfield (GB); Mark G. Waine, Woolhampton (GB); Dale Seavey, Sunol, CA (US); Mike McFall, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 13/335,078

(22) Filed: Dec. 22, 2011

(65) Prior Publication Data

US 2013/0165151 A1    Jun. 27, 2013

(51) Int. Cl.
*H04W 4/02* (2009.01)

(52) U.S. Cl.
USPC ..................... 455/456.3; 455/456.1

(58) Field of Classification Search
USPC ............... 455/435.1, 456.3, 458; 370/328
See application file for complete search history.

(56) References Cited

U.S. PATENT DOCUMENTS

| | | | |
|---|---|---|---|
| 5,446,891 A | 8/1995 | Kaplan et al. | |
| 5,481,294 A | 1/1996 | Thomas et al. | |
| 5,724,567 A | 3/1998 | Rose et al. | |
| 5,983,214 A | 11/1999 | Lang et al. | |
| 6,182,068 B1 | 1/2001 | Culliss | |
| 6,453,345 B2 | 9/2002 | Trcka et al. | |
| 6,873,258 B2 | 3/2005 | Marples et al. | |
| 7,379,992 B2 | 5/2008 | Tung | |
| 7,386,517 B1 | 6/2008 | Donner | |
| 7,415,516 B1 | 8/2008 | Gits et al. | |
| 7,573,833 B2 | 8/2009 | Pirzada et al. | |
| 7,586,877 B2 | 9/2009 | Gits et al. | |
| 7,752,190 B2 | 7/2010 | Skinner | |
| 7,853,967 B2 | 12/2010 | Yoon et al. | |
| 7,975,283 B2 | 7/2011 | Bedingfield, Sr. | |
| 8,180,396 B2 | 5/2012 | Athsani et al. | |
| 8,259,692 B2 | 9/2012 | Bajko | |
| 2002/0050927 A1 | 5/2002 | De Moerloose et al. | |
| 2003/0110485 A1 | 6/2003 | Lu et al. | |

(Continued)

FOREIGN PATENT DOCUMENTS

| | | |
|---|---|---|
| EP | 0837583 | 4/1998 |
| EP | 1199899 | 4/2002 |

(Continued)

OTHER PUBLICATIONS

USPTO Sep. 11, 2012 Non-Final Office Action from U.S. Appl. No. 12/793,545.

(Continued)

*Primary Examiner* — Sam Bhattacharya
(74) *Attorney, Agent, or Firm* — Patent Capital Group (57) ABSTRACT

A method is provided in one example embodiment that includes receiving a location update indicative of a position of a mobile device; determining a proximity of the mobile device to an anchor location based on the position; identifying a preference associated with the mobile device; and sending content to an output device based on the preference and the proximity. In specific implementations, the anchor location is a display device and the content is sent to the output device if the proximity is within a viewing area of the display device. Additionally, the preference can be a preferred language, where content is sent to the output device in the preferred language.

20 Claims, 3 Drawing Sheets

(56) References Cited

U.S. PATENT DOCUMENTS

| | | | |
|---|---|---|---|
| 2005/0114788 A1 | 5/2005 | Fabritius | |
| 2005/0139672 A1 | 6/2005 | Johnson et al. | |
| 2005/0216752 A1 | 9/2005 | Tso et al. | |
| 2008/0050111 A1 | 2/2008 | Lee et al. | |
| 2008/0065759 A1 | 3/2008 | Gassewitz | |
| 2008/0098305 A1 | 4/2008 | Beland | |
| 2008/0122871 A1 | 5/2008 | Guday | |
| 2008/0215428 A1 | 9/2008 | Ramer et al. | |
| 2009/0132823 A1 | 5/2009 | Grimen et al. | |
| 2009/0144157 A1 | 6/2009 | Saracino et al. | |
| 2009/0150918 A1 | 6/2009 | Wu | |
| 2010/0121567 A1 | 5/2010 | Mendelson | |
| 2010/0214111 A1 | 8/2010 | Schuler et al. | |
| 2010/0223114 A1 | 9/2010 | Yao et al. | |
| 2010/0279665 A1* | 11/2010 | Hardin et al. | 455/414.1 |
| 2010/0304766 A1 | 12/2010 | Goyal | |
| 2011/0062230 A1 | 3/2011 | Ward et al. | |
| 2011/0099590 A1 | 4/2011 | Kim et al. | |
| 2011/0141254 A1 | 6/2011 | Roebke et al. | |
| 2012/0007713 A1 | 1/2012 | Nasiri et al. | |
| 2012/0072950 A1 | 3/2012 | Wu | |
| 2012/0095812 A1 | 4/2012 | Stefik et al. | |
| 2012/0135746 A1 | 5/2012 | Mohlig et al. | |
| 2012/0178431 A1 | 7/2012 | Gold | |
| 2012/0208521 A1 | 8/2012 | Hager et al. | |
| 2012/0210250 A1* | 8/2012 | Svendsen et al. | 715/753 |
| 2012/0233687 A1 | 9/2012 | Metivier et al. | |
| 2012/0284012 A1 | 11/2012 | Rodriguez et al. | |

FOREIGN PATENT DOCUMENTS

| | | |
|---|---|---|
| EP | 2067342 | 6/2009 |
| EP | 2577942 | 4/2013 |
| GB | 2326053 | 12/1998 |
| WO | WO 9808314 | 2/1998 |
| WO | WO 0022860 | 4/2000 |
| WO | WO 2006/053275 | 5/2006 |
| WO | WO 2008/032297 | 3/2008 |
| WO | WO 2011/153222 | 12/2011 |

OTHER PUBLICATIONS

USPTO May 2, 2012 Final Office Action from U.S. Appl. No. 12/642,796.
POPAI, "Digital Signage Network Playlog Standards," Version 1.1, POPAI Digital Signage Standards Committee, William Wu, Editor-in-Chief, Aug. 23, 2006, 17 pages; http://www.popai.com/docs/DS/POPAI%20Digital%Digital%20Signage%20Playlog%20Standard%20-%20Version1.1a.pdf.
Digital Signage Companies, "Company Showcase," DigitalSignageToday.com, 4 pages, [Retrieved and printed Apr. 23, 2012] http://www.digitalsignagetoday.com/showcases.php.
Axis Communications, "Security Capabilities," www.axis.com/products/video/about_networkvideo/security_capabilities.htm; printed Dec. 14, 2009; 1 page.
Blass, Evan, "Apple patent embeds thousands of cameras among LCD pixels," http://www.engadget.com/2006/04/26/apple-patent-embeds-thousands-of-cameras-among-lcd-pixels; Apr. 26, 2006; 1 page.
Burfordon, Ben, "Third day in Rio—part 3, Sugarloaf," http://www.davisdenny.com/bensblog/2008/11/third-day-in-riopart-3-sugarlo.html; Nov. 17, 2008; 29 pages.
U.S. Appl. No. 12/396,124 filed Mar. 2, 2009, entitled "Digital Signage Proof of Play," Inventor(s): Robert M. Brush et al.
U.S. Appl. No. 12/925,966 filed Nov. 3, 2010, entitled "Identifying Location Within a Building Using a Mobile Device," Inventor(s): Peter Michael Gits, et al.
USPTO Jan. 18, 2012 Non-Final Office Action from U.S. Appl. No. 12/642,796.
USPTO Apr. 18, 2012 Response to Jan. 18, 2012 Non-Final Office Action from U.S. Appl. No. 12/642,796.
USPTO Apr. 25, 2013 Non-Final Office Action from U.S. Appl. No. 13/300,409.
USPTO Aug. 2, 2012 RCE Response to May 2, 2012 Final Office Action from U.S. Appl. No. 12/642,796.
USPTO Apr. 8, 2013 RCE Response to Final Office Action mailed Jan. 8, 2013 from U.S. Appl. No. 12/793,545.
USPTO Mar. 13, 2013 Non-Final Office Action from U.S Appl. No. 13/165,000.
USPTO Nov. 28, 2012 Non-Final Office Action from U.S. Appl. No. 13/165,123.
USPTO Feb. 28, 2013 Response to Non-Final Office Action mailed Nov. 28, 2012 from U.S. Appl. No. 13/165,123.
USPTO Mar. 25, 2013 Notice of Allowance from U.S. Appl. No. 13/165,123.
U.S. Appl. No. 13/165,000, filed Jun. 21, 2010, entitled "Delivering Wireless Information Associating to a Facility," Inventors: Peter Michael Gits, et al.
U.S. Appl. No. 13/165,123, filed Jun. 21, 2011, entitled "Managing Public Resources," Inventors: Dale Seavey, et al.
U.S. Appl. No. 12/642,796, filed Dec. 19, 2009, entitled "System and Method for Evaluating Content in a Digital Signage Environment," Inventors: Sridhar Acharya, et al.
U.S. Appl. No. 12/793,545, filed Jun. 3, 2010, entitled "System and Method for Providing Targeted Advertising Through Traffic Analysis in a Network Environment," Inventors: Ravindranath C. Kanakarajan, et al.
U.S. Appl. No. 13/300,409, filed Nov. 18, 2011, entitled "System and Method for Generating Proof of Play Logs in a Digital Signage Environment," Inventors: Sriramakrishna Yelisetti, et al.
"3D Drawing in Augmented Reality," posted by String, Digital Graffiti on vimeo.com; [printed Dec. 1, 2011] 2 pages http://vimeo.com/groups/digitalgraffiti/videos/15935674.
"Akoo Bridges Digital and Cell Phone Screens," Blog at WordPress.com [printed on Oct. 24, 2011] 4 pages; http://screenmedia.wordpress.com/2008/02/25/akoo-bridges-digital-and-cell-phone-screens.
Anderson, Steve, "Smartphone as Hotel Room Key?" TFTS High Tech News Portal, Nov. 2, 2010, 6 pages. http://nexus404.com/Blog/2010/11/02/smartphone-as-hotel-room-key-assa-abloy-swedish-door-opening-company-working-on-nfe-smartphone-enabled-door-keys/.
Broadband, "Ask DSLReports.com: What is NebuAD?," Feb. 12, 2008, retrieved and printed Jun. 3, 2010, 17 pages; http://www.dslreports.com/shownews/Ask-DSLReportscom-What-ls-NebuAD-91797.
Cayin Technology Co., Ltd., "Interactive Digital Signage—Integration with Touch Screen & Mobile Devices," [printed Oct. 24, 2011] 2 pages http://cayintech.com/digital_signage_solutions/interactive_digital_signage.
Cayin Technology Co., Ltd., "SMP-WEB4 Web-Based Digital Signage Media Player," Product Information and Brochure; [printed Dec. 1, 2011] 4 pages http://www.cayintech.com/digital_signage_products/digital_signage_player.
Duryee, Tricia, "Mobile Maps are Moving Indoors to Pinpoint Specific Items on Store Shelves," mocoNews.net, Aug. 25, 2010, 1 page http://moconews.net/article/419-mobile-maps-are-moving-indoors-to-help-navigate-within-stores-airports/.
Eaton, Kit, "Foursquare's Digital Graffiti, a Legally Nerve-Wracking Taste of the Future," FastCompany.com, Apr. 2, 2010, 2 pages; http://www.fastcompany.com/1605224/foursquare-virtual-graffiti-geotagging-tagsaugmented-reality-lbs.
"iPhone Opens Hotel Doors—OpenWays Presents its iPhone Application to Bypass Front Desks and Open Room Locks ," Hotel News Resource, Mar. 2, 2010, 6 pages http://www.hotelnewsresource.com/article44075.html.
"Nearest Tube Augmented Reality App for iPhone 3GS from acrossair," video uploaded to YouTube by acrossair on Jul. 6, 2009, 2 pages http://www.youtube.com/watch?v=U2uH-jrsSxs.
Wikipedia, "NebuAd," retrieved and printed Jun. 3, 2010, 11 pages; http://en.wikipedia.org/wiki/NebuAd.
Phorm, Inc., "Consumers Publishers & Networks Advertisers & Agencies ISPs: A personalised internet experience," retrieved and printed Jun. 3, 2010, 2 pages; http://www.phorm.com/.

(56) References Cited

OTHER PUBLICATIONS

Ranveer, Chandra, et al., "Beacon Stuffing, WiFi without Associations," Powerpoint Presentation, [Printed on Dec. 5, 2011] 20 pages http://www.google.com/url?sa=t&rct=j&q=&esrc=s&source=web&cd=5&ved=0CEYQFjAE&url=http%3A%2F%2Fresearch.microsoft.com%2Fen-us%2Fprojects%2Fwifiads%2Fbeaconstuffinghotmobile.ppt&ei=6sm6TrCDEYmpiAK8hcGBBQ&usg=AFQjCNFQbxbGV5KvqjswK3ODTUwumRFvJQ.

"Tonchidot Announces the Launch of Sekai Camera," A Social Augmented Reality App for iPhone, posted by whatz in WhatAboutMacs forum, [printed Dec. 5, 2011], 2 pages http://forums.whataboutmac.com/topic.php?id=1164.

"Cisco Digital Signs," Cisco Digital Media Manager, cisco.com; 2 pages; [Retrieved and printed Sep. 12, 2012] http://www.cisco.com/en/USprod/video/ps9339/ps6681/digital_signs.html.

EPO May 2, 2001 European Search Report from Application No. EP00440277; 2 pages.

Grove, Joseph and Bill Yackey, "Digital Signage Expo Featured Exhibitors: The hardware providers," www.digitalsignagetoday.com/article.php?id=21812; Mar. 4, 2009; 3 pages.

Gutzmann, Kurt, "Access Control and Session Management in the HTTP Environment," IEEE Internet Computing, Jan.-Feb. 2001.

Horowitz, Michael, "What does your IP address say about you?", CNET News, Sep. 15, 2008; 13 pages http://news.cnet.com/8301-13554_3-10042206-33.html.

Information Sciences Institute, University of Southern California, "RFC 793: Transmission Control Protocol—DARPA Internet Program Protocol Specification," prepared for Defense Advanced Research Projects Agency, now maintained by the Internet Engineering Task Force, Sep. 1981; 92 pages.

Nuva Technology, Inc., "AVITAR DSN Software Solution," www.nuvatech.com/avitar.html; printed Dec. 14, 2009; 2 pages.

Parisien, Daniel "The Dirty Little Secret of Digital Signage: Proof of Play vs. Audited Proof of Display," http://blog.broadsign.com/digitalsignagedigest/index.php/2007/10/19/the-dirty-little-secret-of-digital-signage-proof-of-play-vs-audited-proof-of-display; Oct. 19, 2007; 5 pages.

PCT Dec. 4, 2012 International Preliminary Report on Patentability from PCT/US2011/038735; 7 pages.

PCT Oct. 11, 2011 Transmittal of the International Search Report and Written Opinion of the International Searching Authority from PCT/US2011/038735; 14 pages.

PCT-Jul. 2, 2007 International Search Report from PCT/US05/41114; 2 pages.

PCT-Jul. 7, 2007 International Preliminary Report on Patentability and the Written Opinion of the International Searching Authority from PCT/US05/41114.

Richardson, Iain, "An Overview of H.264 Advanced Video Coding," Vcodex/OneCodec White Paper, Jan. 2011, ©Iain Richardson/Vcodex, Ltd. 2007-2011; 7 pages http://www.vcodex.com/files/H.264overview_Jan11.pdf.

Richardson, Iain, "H.264/AVC Loop Filter," Vcodex White Paper, ©Iain Richardson/Vcodex, Ltd. 2002-2011; 3 pages; http://www.vcodex.com/files/H264_loopfilter_wp.pdf.

Richardson, Iain, "Introduction to Image and Video Coding," ©Iain Richardson/Vcodex, Ltd. 2001-2002; 35 pages; http://www.vcodex.com/files/videocoding_intro_1.pdf.

Richardson, Iain, "Video Coding Walk-Through," White Paper, ©Iain Richardson/Vcodex, Ltd. 2011; 10 pages.

Webster, Melissa, "Retail IT Meets Video: Cisco Makes Digital Signage Play Over the Network," Cisco White Paper; Jul. 2007; 14 pages http://www.cisco.com/en/US/solutions/collateral/ns340/ns394/ns158/ns620/net_implementation_white_paper0900aecd806b8c04.pdf.

USPTO Feb. 19, 2013 Non-Final Office Action from U.S. Appl. No. 12/642,796.

USPTO Dec. 11, 2012 Response to Sep. 11, 2012 Non-Final Office Action from U.S. Appl. No. 12/793,545.

USPTO Jan. 8, 2013 Final Office Action from U.S. Appl. No. 12/793,545.

EPO Jul. 2, 2013 Response to Communication from European Application No. 11725843.

USPTO May 20, 2013 Response to Feb. 19, 2013 Non-Final Office Action from U.S. Appl. No. 12/642,796.

USPTO Jun. 3, 2013 Notice of Allowance from U.S. Appl. No. 12/642,796.

USPTO Jul. 10, 2013 Non-Final Office Action from U.S. Appl. No. 12/793,545.

USPTO Oct. 10, 2013 Response to Jul. 10, 2013 Non-Final Office Action from U.S. Appl. No. 12/793,545.

USPTO Jun. 12, 2013 Response to Mar. 13, 2013 Non-Final Office Action from U.S Appl. No. 13/165,000.

USPTO Jul. 10, 2013 Final Office Action from U.S Appl. No. 13/165,000.

USPTO Oct. 9, 2013 RCE Response to Jul. 10, 2013 Final Office Action from U.S Appl. No. 13/165,000.

USPTO Jun. 25, 2013 Request for Continued Examination Response to Mar. 25, 2013 Notice of Allowance from U.S. Appl. No. 13/165,123.

USPTO Jul. 12, 2013 Notice of Allowance from U.S. Appl. No. 13/165,123.

USPTO Jun. 24, 2013 Response to Apr. 25, 2013 Non-Final Office Action from U.S. Appl. No. 13/300,409.

USPTO Sep. 27, 2013 Final Office Action from U.S. Appl. No. 13/300,409.

USPTO Jan. 28, 2014 Final Office Action from U.S. Appl. No. 12/793,545.

* cited by examiner

SYSTEM AND METHOD FOR PROVIDING PROXIMITY-BASED DYNAMIC CONTENT IN A NETWORK ENVIRONMENT

TECHNICAL FIELD

This disclosure relates in general to digital media, and more particularly, to a system and a method for providing proximity-based dynamic content in a network environment.

BACKGROUND

Network-based digital media provides many innovative ways to enhance marketing opportunities and customer experiences, improve communications, and deliver valuable information. For example, digital signs can be used to promote products and services directly to customers on premises, and to deliver entertaining content to reduce perceived wait times. Schedules, news, and emergency messages may also be delivered through digital media signage. Digital media signage can also be customized, for example, by geography, time of day, season, or demographics: making content much more relevant to consumers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a location update indicative of a position of a mobile device. The position can be provided as X, Y coordinates, geographic information, satellite data (e.g., global positioning system (GPS) data), etc. The method also includes determining a proximity (e.g., a nearness, distance, etc.) of the mobile device to an anchor location based on the position. The method further includes identifying a preference associated with the mobile device. The preference can be set by the user, administrator, a service provider, or provided as a default setting of the mobile device.

The method further includes sending content to an output device based on the preference and the proximity. In specific implementations, the anchor location is a display device (e.g., configured for providing digital advertising), and the content is sent to the output device if the proximity indicates that the mobile device is within a viewing area of the display device. The mobile device may be the output device itself, or the output device may be another device (e.g., a laptop, a personal digital assistant, etc.), or the output device may be the display. Additionally, the preference can be a preferred language, where content is sent to the output device in the preferred language.

In yet another embodiment, the content can be provided as a Resource Description Framework (RDF) Site Summary (RSS) feed to the mobile device. In addition, a compass can be used to select one of a plurality of displays within range of the mobile device. A quick response code can be provided to the mobile device to distinguish the plurality of displays within range. In alternative embodiments, the method may include pushing a notification to the mobile device that content is available in an alternate language. In certain scenarios, the method can include determining a plurality of mobile devices are within range of the anchor location; and determining a majority language preference associated with the plurality of mobile devices for delivering the content.

Example Embodiments

Figure 1:
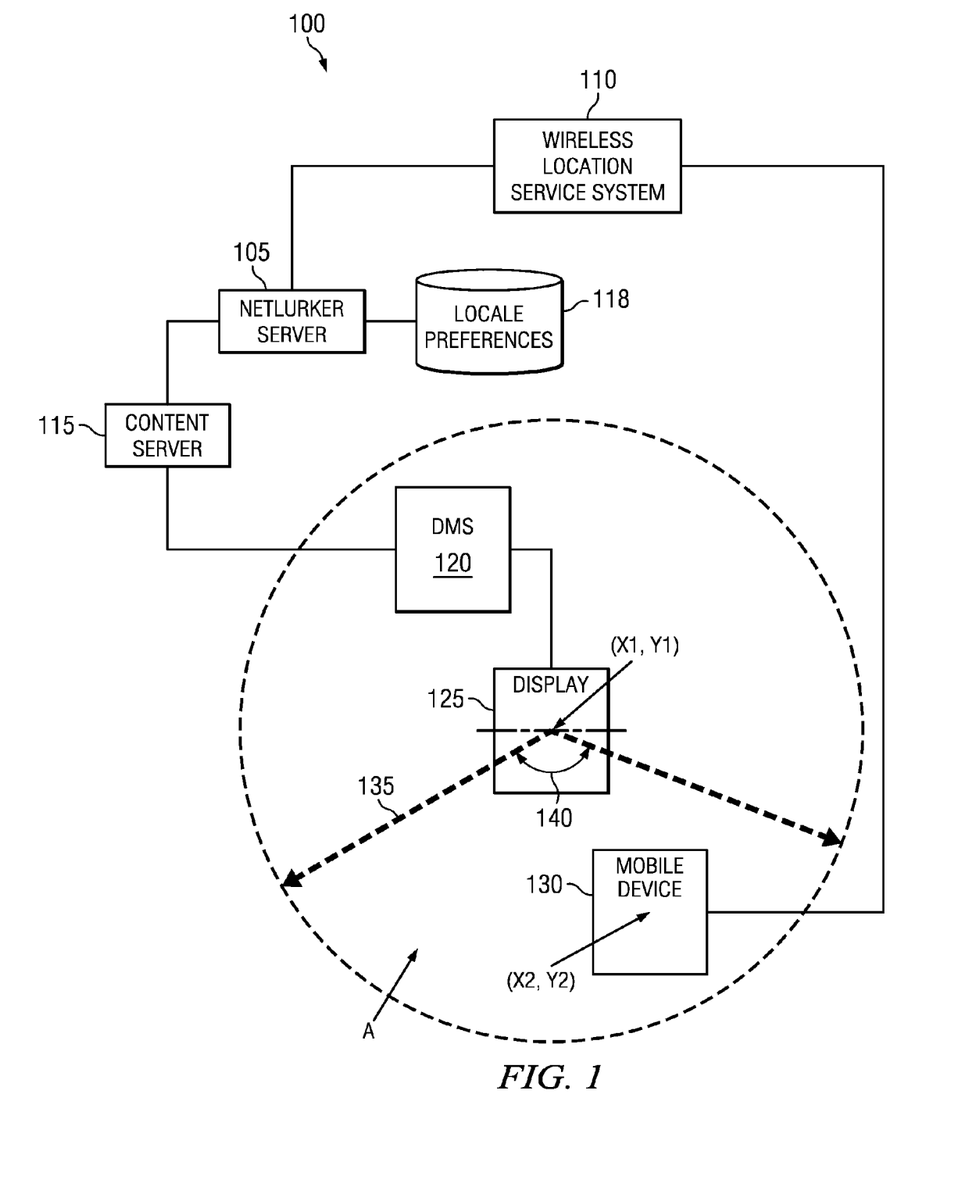
FIG. 1 is a simplified block diagram illustrating an example embodiment of a network environment for providing language-appropriate content in accordance with this disclosure.

Turning to FIG. 1, FIG. 1 is a simplified block diagram of an example embodiment of a network environment 100 in which dynamic content may be delivered to an output device based on proximity and preferences configured for a mobile device. Network environment 100 generally includes a netlurker server 105, which may be linked to a wireless location service system 110 and a content server 115. A preferences database, such as a locale preferences 118 (also referred to as simply locale preferences database herein), may also be linked to (or integrated with) netlurker server 105. Content server 115 may be linked to (or integrated with) a digital media system (DMS) 120, which may be coupled to an output device, such as a display 125 or a mobile device 130 (e.g., within a range 135 of DMS 120 or display 125). Mobile device 130 may also communicate with wireless location service system 110.

In the example scenario of FIG. 1, display 125 is located at (X1, Y1) in a grid coordinate system (not shown) associated with network environment 100, and mobile device 130 is located at (X2, Y2). Moreover, display 125 is oriented such that a positive view is provided to any viewer facing display 125 within a viewing area A. The term 'view' (e.g., viewing area A) includes any area that provides a positive view (or least some visibility) to an output device when a person is generally oriented toward the output device (e.g., approaching, walking toward, facing, in front of, near). This may be dependent upon several factors including venue layout and technology of the output device. In the example of FIG. 1, the viewing area A can be generally defined by a range 135 and an angle 140.

The display itself may include any suitable digital sign, surface, television, endpoint device, or any other suitable rendering mechanism appropriate for displaying, playing, offering, etc. a digital content. Hence, the actual display can include any suitable surface at which video data and so sure graphics can be rendered for an audience (consumer, student, etc.). Note that as used herein in this Specification, the term 'display' is meant to connote any element that is capable of delivering an image, video data, text, sound, audiovisual data, etc. to an end user. This would necessarily be inclusive of any panel, plasma element, television, monitor, computer interface, screen, electronic billboard, wall for projection activities, TelePresence devices (inclusive of TelePresence boards, panels, screens, surfaces, etc.), or any other suitable element that is capable of delivering/rendering/projecting such information. This could include larger panels or screens at concert events, in sports venues (e.g., scoreboards, banners, jumboTrons, baseball fences, etc.), or on the sides of buildings (e.g., in Times Square in New York, or downtown Tokyo, and other urban areas, where advertising is prevalent), or vehicle advertisements (e.g., where a truck or other types of vehicles are tasked with trolling certain streets and neighborhoods to deliver advertising content).

Each of the components of FIG. 1 may couple to one another through simple interfaces or through any other suitable connection (wired or wireless), which provides a viable pathway for network communications. Additionally, any one or more of these elements may be combined or removed from the architecture based on particular configuration needs. Network environment 100 may include a configuration capable of transmission control protocol/Internet protocol (TCP/IP) communications for the transmission or reception of packets in a network. Network environment 100 may also operate in conjunction with a user datagram protocol/IP (UDP/IP) or any other suitable protocol where appropriate and based on particular needs.

For purposes of illustrating techniques for delivering proximity-based dynamic content in example embodiments, it is important to understand certain contextual information concerning network environment 100. The following foundational information may be viewed as a basis from which the present disclosure may be properly explained. Such information is offered earnestly for purposes of explanation only and, accordingly, should not be construed in any way to limit the broad scope of the present disclosure and its potential applications.

In general, a DMS can render (or cause to be rendered) digital media on an output device, such as a video display device. In this context, "digital media" (or "digital content") refers broadly to any form of electronic media in which content is provided in a digital form. Digital media may be stored in a web page, for example, and the web page may include text, audio, and/or video. The display (i.e., the rendering of digital media in visual form) may be varied to some extent by providing alternate content and, further, by configuring locale preferences or a localization setting: both of which can include a language identifier and/or a region identifier. For example, an administrator may configure default locale preferences based on geography or a target audience; however, a viewer of mobile device 130 may also be able to override the default locale preference and select a different locale preference if the DMS provides a touch screen interface (where alternate content is available).

The architecture of FIG. 1 provides significant opportunities to enhance the delivery of digital content through a DMS. More particularly, wireless technologies may be used to provide location services within a facility or other venue. In some instances, the location services may be further combined with other wireless service capabilities, such as identifying distance, time, and user identity. For example, the architecture of FIG. 1 may be able to track a person through signals received from a mobile device carried by the person and, subsequently, identify the proximity of the mobile device (and the person) to a DMS.

In accordance with embodiments disclosed herein, the architecture of FIG. 1 can be configured to dynamically select content based on a mobile device's preferences and proximity to an anchor location (e.g., any suitable output device, display 125, or a DMS). An anchor location may include tangible objects, such as an output device or a DMS, or it may be an empty space at designated coordinates in some frame of reference, for example. Preferences generally represent some variable, parameter, or setting (or collection thereof) that may change or customize the behavior of (or interaction with) the components of FIG. 1.

In more particular embodiments, a mobile device's location may be discovered through a wireless location service system, and an application on a mobile device can be configured with preferences, such as native language settings, to allow dynamic selection of content (such as language-appropriate content) based on the preferences. In some embodiments, the content may be delivered to an output device coupled to the DMS, or to an output device integrated with (or coupled to) the mobile device. In yet other embodiments, the content may be delivered to a mobile device for subsequent viewing.

In one example implementation of network environment 100, a web server can be used as a Resource Description Framework (RDF) Site Summary (RSS) feed (also known as a Really Simple Syndication feed), and content can be stored as RSS documents. The web server can detect a mobile device's proximity to a fixed or stationary asset through a wireless location service system, for example. The location may be stored by netlurker server 105, for example. In one particular embodiment, the location may be stored with an identifier associated with a DMS (e.g., identified at: /netlurkers.com/usersMacAddress/DMSid). An appropriate RSS feed can be dynamically selected based on the mobile device's preferences and pushed to an output device based on the mobile device's proximity. Once a mobile device moves within a particular range of a DMS, content may also be delivered to the mobile device.

In another example implementation, a DMS can use the same web server and, based on preferences configured in a mobile device, can retrieve content to be rendered. In one particular embodiment, a DMS can retrieve a mobile device's preferred language from a parameter stored on a netlurker server (e.g., netlurkers/DMSid/LanguageSpoken). A DMS can be configured to know its identity and (within the URL) pull the appropriate content (e.g., RSS feed) to be played to a person based on the language preferences of the person's mobile device. Alternatively, an HTML5 widget can be used with a session cookie that stores the preferred language. Eventually, the content can return to a default language after a timeout, or after the mobile device moves away from an output device (based on proximity information provided by a wireless location service system, for example).

Figure 2:
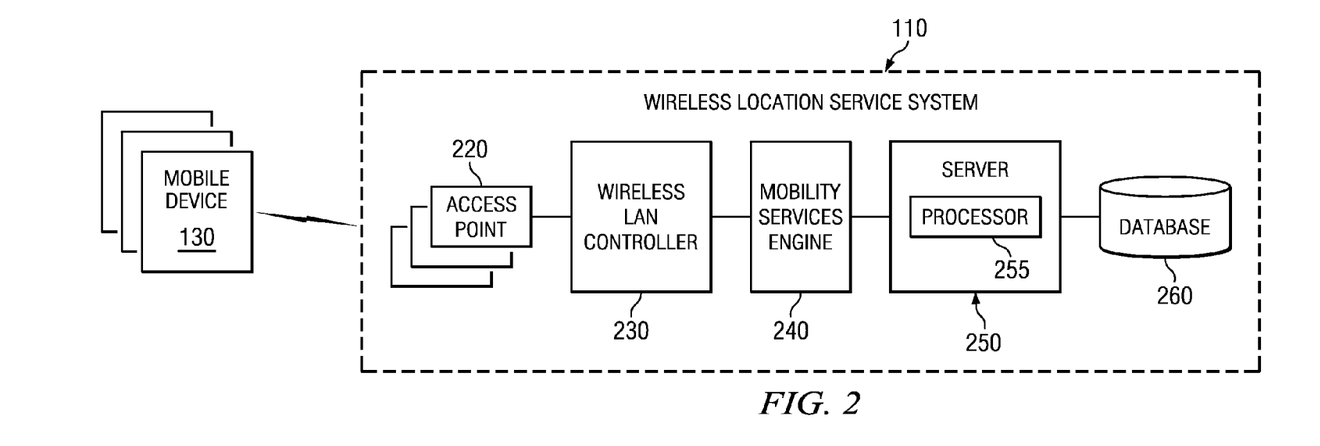
FIG. 2 is a simplified block diagram illustrating additional details that may be associated with a wireless location service system in some embodiments of the present disclosure.

FIG. 2 is a simplified block diagram illustrating additional details that may be associated with wireless location service system 110 in some embodiments of network environment 100. In the example implementation illustrated in FIG. 2, wireless location service system 110 includes one or more wireless access points 220, a wireless local area network (WLAN) controller 230, a mobile services engine (MSE) 240, a server 250, and a database 260. In some implementations, wireless location service system 110 may include additional and/or different features, components, and/or subsystems. Moreover, some features, components, and/or subsystems may be integrated into a single unit, while some may be located remotely. At a high level, wireless location service system 110 may provide services including locating devices, objects, and/or facilities, transmitting, receiving, and/or processing signals associated with physical locations, devices, objects, and/or facilities.

Wireless access point 220 represents an electronic device that may allow mobile devices, such as mobile device 130, to connect to a wired network using WiFi, Bluetooth, WiMAX, or other wireless communication standards. In some implementations, wireless access point 220 may be connected to a router (e.g., via a wired network), and may relay data between mobile devices and fixed devices in network environment 100. In general, wireless access point 220 may act as a bridge, router, and/or a client in wireless location service system 110. Wireless access point 220 may also be in communication with one or more WLAN controllers 230. WLAN controller 230 may be used to manage one or more access points 220. WLAN controller 230 may be part of a data plane within a wireless system model. WLAN controller 230 may also be used to automatically handle the configuration of wireless access point 220 in some wireless system models. In some implementations, WLAN controller 230 may further be configured for communication with MSE 240, which generally supports wireless services to provide centralized and scalable service delivery, including location services.

At a generic level, server 250 comprises electronic computing device(s) operable to receive, transmit, process, store, and/or manage data and signals associated with network environment 100. More particularly, server 250 may be responsible for processing signals bearing one or more kinds of information received from mobile device 130 including information descriptive of movement of the mobile device, distance information, time information, range information, and address information. Server 250 may also be responsible for processing information received from wireless access point 220, WLAN controller 230, and MSE 240 (including information associating the identifying location information of the mobile devices), and for monitoring information associated with the operation mode of the mobile devices. Server 250 may also store one or more applications and process such applications for providing services to the mobile devices operating in network environment 100. Server 250 may be communicably coupled to WLAN controller 230, MSE 240, and database 260.

In general, server 250 represents any server that can store one or more hosted applications, where at least a portion of the hosted applications are executed via requests and responses (sent to or from mobile devices or other clients within network environment 100). In some instances, server 250 may be a dedicated server for storing and executing only a single hosted application. In some instances, server 250 may be a web server in which hosted applications are web-based applications that may be accessed and executed by mobile devices or other clients in network environment 100 to perform the programmed tasks or operations of the hosted applications.

Although FIG. 2 illustrates a single server, wireless location service system 110 may be implemented using two or more servers, as well as other types of computers, including a server pool. Server 250 may be any computer or processing device such as, for example, a blade server, a general-purpose personal computer, a workstation, or any other similar devices, which may be adapted to execute any operating system, including Linux, UNIX, Windows, OS X, or any other suitable operating system.

Server 250 may include a processor 255 for performing instructions and one or more memory devices for storing instructions and data. Although illustrated with only a single processor in FIG. 2, two or more processor may be used according to particular needs, desires, or particular implementations of server 250. Generally, processor 255 receives instructions and data from a read-only memory (ROM) or a random access memory (RAM), or both. In some instances, instructions and data may be stored in database 260 external to server 250. Generally, server 250 may include, or be operatively coupled to receive data from or transfer data to, or both, one or more non-transitory mass storage devices for storing data (e.g., magnetic, magneto optical disks, or optical disks). Processor 255 may include a central processing unit (CPU), a blade, and application specific integrated circuit (ASIC), a field-programmable gate array (FPGA), or another suitable component. The functions of processor 255 may also include computation, queue management, control processing, graphic acceleration, video decoding, and execution of a sequence of stored instructions from a program kept in memory or database 260. In some implementations, processor 255 also may be responsible for signal processing, including sampling, quantizing, encoding/decoding, and/or modulation/demodulation of a signal.

Server 250 may also be communicably coupled to database 260. In general, database 260 may be a system used to organize, store, and/or retrieve data. Database 260 may include an organized collection of data for one or more uses, typically in digital form. Data stored in database 260 may be managed by server 250. In some instances, server 250 may store database contents, allowing data creation and maintenance, and search and other access. In some implementations, database 260 may store location information. For example, data stored in database 260 may contain information associated with location of rooms, digital displays, mobile devices, and/or other equipment, and in some instances may be identified by a mobile device located in the room or on the equipment, or may be identified by other means and stored in database 260. For example, a WiFi enabled electronic device (e.g., access point 220) may be located in a room to provide location information. In an enterprise environment, venues (e.g., conference rooms) may be mapped out within an office building or complex. Each conference room may be measured based on a reading between an access point and edges of the conference room and, subsequently, mapped out and tagged with coordinates. This may eliminate the need for a mobile device to identify a fixed location. Stored measurements may also be updated or corrected.

In some implementations, the information stored in database 260 may include map information, such as a floor plan of a conference center or a map of an outdoor venue, for example. Wireless location service system 110 may use radio frequency (RF) fingerprinting to locate facilities and/or users based on such maps. Server 250 may perform an RF prediction that may be used to create a grid overlay for a map that includes physical characteristics and access points 220 in a given area. For finer accuracy, measurements and a calibration may be taken by wireless location service system 110.

In regards to RF fingerprinting, real-time data regarding physical object locations in a given area may be gathered by access points 220. RF fingerprinting may be gathered based on location identifiers (e.g., RFIDs) included in mobile devices, object, and/or facilities in an area. The RF real-time data may be compared to the grid to determine a mobile device's location relative to the facilities in proximity. With RF fingerprinting, server 250 may use the information that it receives from access points 220 and match it against database 260 of location fingerprints. A database that includes RF fingerprinting may take into account the map of an area, as well as path-loss attenuation, shadowing effect, multi-path fading effect, and/or mobility of a mobile device. Triangulation may use multiple access points 220 to locate a mobile device based on the received signal strength of the device at each access point 220.

Server 250 may determine the intersection point of the mobile device's signal at each access point 220 to identify the device's most likely location. Server 250 may also use a closest access point method to find a mobile device within the total coverage area of a single access point 220. Alternatively or additionally, server 250 may receive location information from a Global Position System chipset on a mobile device and/or from an inertial navigation system resident on-board a mobile device. The location of mobile device 130 may be identified at regular predefined intervals or at the occurrence of an event (e.g., an application activated or movement of the device). In some instances, the location data may be sent to database 260 communicably coupled to server 250, along with a time stamp corresponding to when the mobile device was located.

In general, the architecture of FIG. 1 facilitates wireless communications between mobile devices, as well as with any other local or remote devices. Network environment 100 may represent all or a portion of an enterprise or a secured network, while in another instance at least a portion of network environment 100 may represent a connection to the Internet. In some instances, a portion of network environment 100 may be a virtual private network (VPN), such as, for example, a connection between mobile device 130 and wireless location service system 110. Further, all or a portion of network environment 100 may comprise wireless links. Example wireless links may include 802.11a/b/g/n, 802.20, WiMAX, Bluetooth, and/or any other appropriate wireless link. In other words, network environment 100 may encompass any internal or external network, networks, sub-network, or combination thereof operable to facilitate communications between various computing components. Network environment 100 may, for example, communicate Internet Protocol (IP) packets, Frame Relay frames, Asynchronous Transfer Mode (ATM) cells, voice, video, data, and other information between network addresses. Network environment 100 may also include one or more local area networks (LANs), wireless LANs (WLANs), radio access networks (RANs), metropolitan area networks (MANs), wide area networks (WANs), all or a portion of the Internet, and/or any other communication system or systems at one or more locations.

Wireless location service system 110 may be used to provide service(s) to one or more mobile devices. Mobile device 130 may be any computing device operable to connect to or communicate with wireless location service system 110. In general, mobile device 130 may include any electronic computing device operable to receive, transmit, process, and/or at store appropriate data associated with network environment 100. Any number of mobile devices may be associated with network environment 100. Additionally, there may also be one or more additional mobile devices external to network environment 100 that may be capable of interacting with wireless location service system 110. Further, the terms "mobile device" and "mobile user" may be used interchangeably as appropriate without departing from the scope of this specification. Moreover, while mobile device 130 may be described in terms of being used by a single person, this specification contemplates that many people may use mobile device 130, or that one person may use multiple mobile devices. In some implementations, mobile device 130 may be a mobile device used by person to communicate information using radio technology and performing a plurality of computing tasks.

Figure 3:
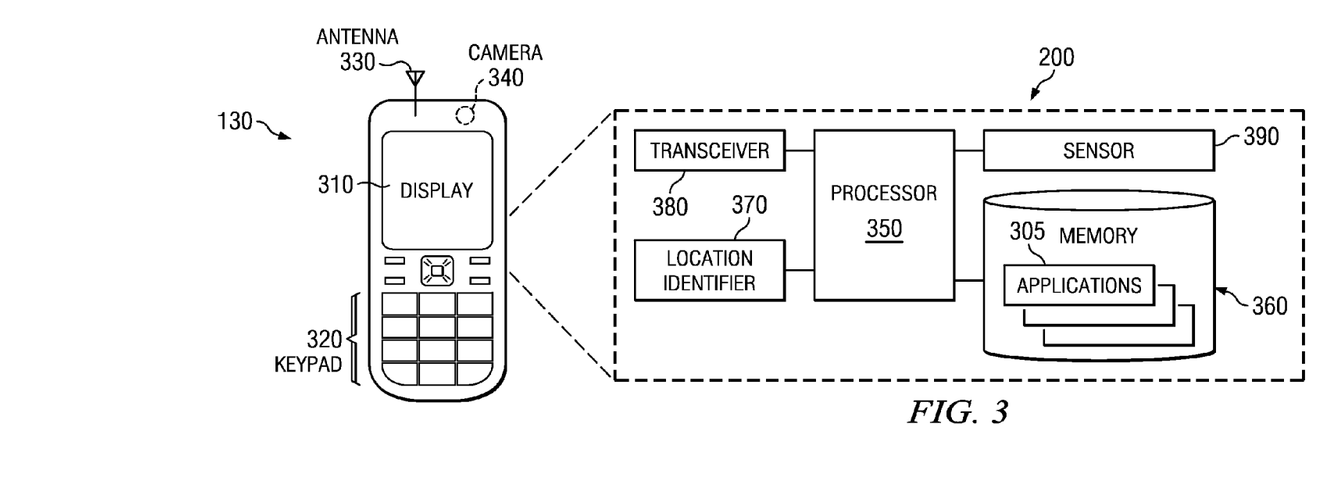
FIG. 3 is a schematic block diagram illustrating additional details that may be associated with an example embodiment of a mobile device in the network environment.

FIG. 3 is a schematic block diagram illustrating additional details that may be associated with an example embodiment of mobile device 130. As indicated generally at arrow 200, mobile device 130 may include a display 310, a keypad 320, one or more antennas 330, one or more cameras 340, a processor 350, a memory 360, a location identifier 370, a transceiver 380, and a sensor 390.

Display 310 is generally an output device for presentation of information in visual or tactile form in response to electronic input signals. In some implementations, display 310 may include a touchscreen, which is an electronic visual display that may detect the presence and location of a touch within the display area. The term "touch" may generally refer to touching the display of the device with a finger or hand. Touchscreens also may sense other passive objects, such as a stylus. Display 310 may be used to display location-related information, a real-time view of the environment, a mobile user identity, and other appropriate information without departing from the scope of the disclosure.

Keypad 320 is an input unit of mobile device 130. A keypad may include multiple keys arranged in a block, which includes numerical keys, alphabetic keys, standard telephone keys, or any other icons or symbols. In some implementations, keypad 320 also may be shown on a touchscreen, which may be integrated with display 310.

Mobile device 130 also may include at least one antenna 330. The antenna 330 may be internal or external to mobile device 130. Antenna 330 may include a transducer, which may transmit and/or receive electromagnetic waves. Antenna 330 may be configured to convert electromagnetic radiation into electric current, or vice versa. Antenna 330 is generally responsible for the transmission and reception of radio waves, and may serve as the interface between transceiver 380 and a wireless channel. In some implementations, multiple antennas 330 may be included in mobile device 130 to enable multiple-input-multiple-output (MIMO) technology for increasing transmission rate and/or reliability.

One or more cameras 340 also may be included in mobile device 130. Cameras 340 may be used to record images. The images recorded by camera 340 may include a still image or moving images such as movies or videos. The one or more cameras 340 may also be used to capture real-time images that may be displayed instantaneously. Each of the one or more cameras 340 may also include an optical sensor (not shown). The optical sensor may be a charge-coupled device, complementary metal-oxide semiconductor (CMOS), or any other suitable device. The optical sensor receives light projected through one or more lenses and converts the light to data representing an image.

Mobile device 130 may also be referred to as a mobile electronic device, user device, mobile station, subscriber station, user equipment, or wireless terminal. Mobile device 130 may be a wireless phone, a personal data assistant (PDA), a smartphone (e.g., iPhone), a laptop, a tablet computer, an IP phone, a Google Droid, a touch screen terminal, or any other wireless communication device capable of performing a plurality of tasks, including communicating information using a wireless technology. Mobile device 130 may include any number of other user interfaces (not shown) such as one or more manual buttons (e.g., switches). A mobile user may select and activate the applications by touching the touchscreen or pressing one or more buttons. The mobile device may also include one or more speakers and one or more microphones (not shown).

As illustrated in FIG. 3, mobile device 130 includes processor 350. Although illustrated as a single processor 350 in FIG. 3, two or more processors may be used according to particular needs, desires, or particular implementations of mobile device 130. Generally, processor 350 executes instructions and manipulates data to perform the operations of mobile device 130 and, specifically, the one or more plurality of applications 365 stored in memory 360. Processor 350 also may include feature sets similar to the functionalities of processor 255 included in server 250 as illustrated in FIG. 2.

Memory 360 may include any memory or database module and may take the form of volatile or non-volatile memory including, without limitation, magnetic media, optical media, random access memory (RAM), read-only memory (ROM), removable media, or any other suitable local or remote memory component. Memory 360 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of mobile device 130 and its one or more applications 365. At a high level, each of the one or more applications 365 is any application, program, module, process, or other software that may execute, change, delete, generate, or otherwise manage information according to this specification, particularly in response to and in connection with one or more location-based services. Additionally, applications 365 may include a child or sub-module of another software module or application.

Wireless transceivers 380 may include both the transmitter circuitry and the receiver circuitry. Wireless transceivers 380 may be responsible for up-converting a baseband signal to a pass band signal or vice versa. The components of wireless transceivers 380 may include a digital to analog converter/analog to digital converter, amplifier, frequency filter, and oscillator. The wireless signals transmitted or received by antenna 330 may be processed directly before/after being processed by transceivers 380.

Location identifier 370 may be used for assisting wireless location service system 110 to determine the position and/or identity of mobile device 130. In some instances, location identifier 370 may include proximity sensor, optical sensor, magnetometer, compass, RFID tag, wireless sensor, or any other device configured to determine the position and/or identity of mobile device 130. Location identifier 370 may be used in combination with one or more components of wireless location service system 110 to identify the location of mobile device 130 or may store information received from wireless location service system 110 indicating the location of the mobile device.

The example mobile device 130 also includes a sensor 390. Sensor 390 may be used for the detection of different manual manipulations, including, for example, orientation, motion, tilt, etc. Sensor 390 may include, for example, a motion detector, accelerometer, gravity meter, gyroscope, etc. In some instances, sensor 390 determines the orientation of the device (e.g., horizontal, vertical) based on analysis of data received from one or more accelerometers. The accelerometer may detect movement of mobile device 130 along any axis (e.g., horizontal, vertical) or any combination of planes (e.g., three-dimensional movement).

Figure 4:
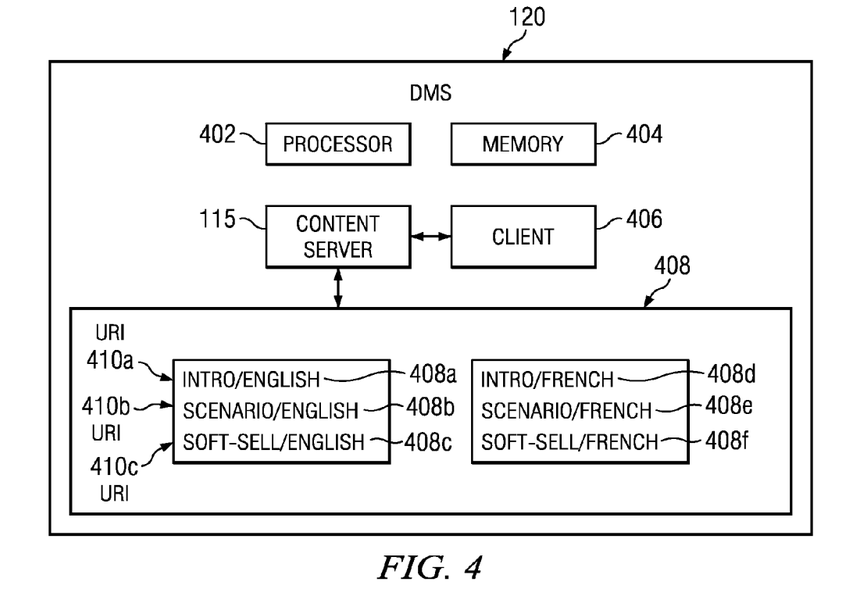
FIG. 4 is a simplified block diagram illustrating additional details that may be associated with an example embodiment of a digital media system in the network environment.

FIG. 4 is a simplified block diagram illustrating additional details that may be associated with an example embodiment of DMS 120 in network environment 100. This example embodiment of DMS 120 includes a processor 402 and a memory 404. Moreover, DMS 120 may also include additional hardware and/or software elements, such as content server 115 and a client 406, and data elements such as content 408. Hence, appropriate software and/or hardware may be provisioned in DMS 120 to facilitate the activities discussed herein.

In more particular embodiments, content server 115 may be implemented as a web server and content 408 may be implemented as one or more RSS documents. In such an embodiment, content server 115 may employ a hypertext transfer protocol (HTTP) to facilitate exchange of content 408 with client 406. HTTP, as commonly implemented, is a request/response application-level protocol, which can use a transport layer protocol such as TCP to create a connection and transfer data between two network nodes (i.e., a client and a server) each having a unique network address. In general, a "server" may be any node (or software component of a node) in a network that provides a resource to other nodes. A "client" may be any node (or software component of a node) in a network that requests a resource.

Many types of content may be transported through HTTP, including documents, images, programs, and services. In general, content includes any object, data, information, service, or other abstract concept that can be identified and accessed over a network connection. Content can be identified by any string of characters and/or numbers, such as a Uniform Resource Identifier (URI) scheme, for example. A URI may be classified as a locator, a name, or both. A Uniform Resource Name (URN) is one example of a resource identifier that can identify a resource (i.e., content) by a unique name within a given namespace, while a Uniform Resource Locator (URL) is an example of a resource identifier that can specify a location of a resource. A URI can also specify a mechanism for retrieving the resource (e.g., a protocol). URI schemes are often designed to work with a particular protocol. A common URL scheme for unambiguously identifying network resources, for example, consists of a service identifier (e.g., "http"), followed by a service source, which may be a host name (or IP address) combined with a path to a resource (e.g., a file or program).

In the embodiment illustrated in FIG. 4, content 408 may be advertising media that includes introductory media 408a, scenario media 408b, and soft-sell media 408c. Moreover, content 408 may include content in alternate languages. For example, as illustrated in FIG. 4, content 408 may include advertising media 408a-408c in English (e.g., as the default language), and French advertising media 408d-408f as an alternate. Alternate languages may be provided in static documents or generated dynamically by a translator module (not shown). Client 406 can store URIs (or URLs) 410a-410c that identify media 408a-408c, respectively. For example, URIs 410a-410c may be implemented as symbolic links to media 408a-408c. Thus, a client such as client 406 can establish a connection to content server 115 and use a URI (e.g., any of URIs 410a-410c) to request a resource (e.g., media 408a-408c) from content server 115. Moreover, client 406 can be implemented as an RSS reader (also known as a feed reader, newsreader, aggregator, etc.) that periodically retrieves a resource. For example, client 406 can run a loop that requests URI 410a, waits five seconds, requests URI 410b, waits ten seconds, requests URI 410c, waits twenty-five seconds, and then repeats the loop. Server 115 can monitor the connection and send a response after receiving a request from client 406. The response may include the requested resource, an error message, or other information.

Figure 5:
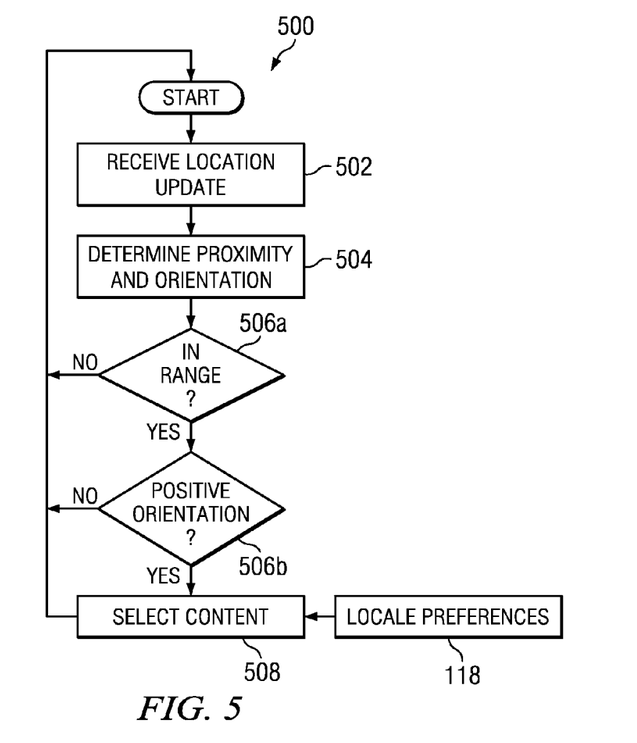
FIG. 5 is a simplified flow diagram illustrating potential operations that may be associated with providing language-appropriate content in an example embodiment of the present disclosure.

FIG. 5 is a simplified flow diagram 500 illustrating potential operations that may be associated with providing language appropriate content in an example embodiment of network environment 100. Such operations may be implemented as hardware or software modules in netlurker server 105 and/or DMS 120, for example. As a preliminary operation, a mobile device (e.g., mobile device 130) may register with netlurker server 105 or wireless location service system 110 to provide a device identifier and a locale (e.g., language) preference, which may be stored (e.g., in the locale preferences database) for subsequent retrieval. For example, mobile device 130 may register with wireless location service system 110 and provide a media access control (MAC) address of mobile device 130 and a locale preference that indicates the native language of mobile device 130 is French, and wireless location service system 110 may store the MAC address and language preference as a record in the locale preferences database.

To further facilitate the registration process, an application (e.g., one of applications 365) may be installed on a mobile device to guide a user through registration and selection of a language preference. Alternatively or additionally, a DMS may provide a matrix barcode (e.g., a Quick Response code), high capacity color barcode (e.g., MICROSOFT tag), or similar code on a display, which can be scanned by a mobile device to open a web page. Such a web page may, for example, contain a registration form or may download a registration application to the mobile device. Moreover, additional features may be implemented to enhance both user experience and operator return once such an application is installed on a mobile device. For example, notifications may be pushed to a mobile device based on proximity, such as a notification that alternate content may be available by launching the application. A notification may also be sent to other people (e.g., a vendor) that someone has entered an area (e.g., approached a display).

In operation, mobile devices in network environment 100 may be tracked, such as by receiving periodic location updates at 502. Based on the location of a mobile device and an anchor location, the proximity and orientation of a mobile device relative to the anchor location may be determined at 504. An anchor location need not be immobile. For example, an output device such as a display screen on a tablet computer or the like may be configured as an anchor location.

In a scenario in which the anchor location is an output device, the proximity and orientation of the mobile device may be used to determine if the mobile device is within a viewing area (e.g., viewing area A of FIG. 1) of the output device. In some embodiments of network environment 100, the viewing area may be generally defined by a range (e.g., range 135) and orientation angle (e.g., angle 140). Thus, if the mobile device is within range at 506a and has a positive orientation (i.e., view) at 506b, content (i.e., media) in a preferred language may be dynamically selected at 508 based on locale preferences 118 associated with the mobile device, and sent to an output device for rendering. A default range may be configured, based on environmental constraints for example.

In some embodiments, an application on mobile device 130 may be used to set individual range preferences that can supersede the default. For example, an administrator may configure a default range of ten meters, but a user may want to limit the range to five meters. The content for the output device may return to a default locale preference after a timeout period, or by movement of the mobile device, such as by "wanding" the mobile device or moving away from the output device.

For example, MSE 240 may periodically receive a MAC address and coordinates of mobile device 130 as mobile device 130 moves through a venue associated with network environment 100. If a person with mobile device 130 moves near display 125, netlurker 105 may receive a location update (e.g., X, Y coordinates) from MSE 240 and determine the proximity and orientation of mobile device 130, such as by comparing the coordinates of mobile device 130 with the coordinates and orientation of display 125 (which may be provisioned as a stationary asset in database 260, for example). If netlurker 105 determines that mobile device 130 is within a given range (e.g., a ten meter radius) from display 125 and in a positive orientation (i.e., an orientation that provides a positive viewing angle, such as in viewing area A in front of display 125), netlurker server 105 may modify URIs 410a-410c based on locale preferences associated with the MAC address of mobile device 130 stored in the database. For example, if the locale preferences database includes a record that associates the MAC address of mobile device 130 with a locale preference for French, then netlurker server 105 may modify URIs 410a-410c to link to alternate media 408d-408f, respectively.

Additionally, it may be determined if alternate media 408d-408f (or any content other than the default content) is already being displayed. If the default content is displayed, it may be saved. A request for alternate media 408d-408f may be placed in a queue with a session identifier (e.g., if other content is currently displayed). Within a queue, the next request can be displayed at the end of the current loop. If there are no outstanding requests/competing languages, URIs 410a-410c may be updated immediately so that alternate media 408d-408f is displayed with minimal delay.

In yet other embodiments, content may be selectively displayed on a mobile device instead of (or in addition to) a display coupled to a DMS. In still other embodiments, content may be delivered to a mobile device for subsequent viewing. For example, a user may be prompted via an application installed on the user's mobile device when the user is walking away from a display, or the user may configure the application to download all content from a DMS when in range. Moreover, content viewing may be tracked (e.g., by netlurker server 105, DMS 120, or mobile device 130) to reduce or eliminate repeated display of content and make a viewing experience unique across all instances of DMSs in network environment 100.

In some instances, a mobile device may be within range of more than one display. In one embodiment, a compass on a mobile device may be used to distinguish multiple displays within range of the mobile device. For example, a compass may be used to determine which display the mobile device is facing. In this sense, the compass can be any instrument that can offer some guidance as to the current location, direction, orientation, or position associated with either the mobile device, or the user himself. If the mobile device is facing more than one (e.g., one display is behind the other), the closest display may be selected. In other embodiments, a barcode (e.g., Quick Response code) or similar code on displays may be used to distinguish multiple displays within range, allowing a user to scan the code to select an appropriate display.

In other instances, mobile devices with more than one language preference may be within range of a single display. In one embodiment, alternate language content may be selected based on a first-in-first-out (FIFO) list that can be dynamically queued based on first arrival. For example, wireless location service system 110 can be used to determine which mobile device arrived first and which mobile devices are dwelling in front of a display longer. In other embodiments, language content may be selected based on the language majority (i.e., the language preferred by the largest number of people, as indicated by locale preferences of their mobile devices). This feature could be significant in the case of a crowd passing by a given digital sign. Once the majority language content has been displayed, the next largest language preference may be determined and content changed accordingly.

In yet other embodiments, a notification can be sent to a mobile device with the option of viewing the alternate language content concurrently on the mobile device, or storing it for subsequent viewing. A Quick Response code (over layered on top of the video (e.g., in the right-hand corner of the mobile device's display)) would allow the user to select the language link from their mobile device if not preconfigured (or the application not yet installed). Once selected, the choice can be remembered for the next digital display. In yet other embodiments, an application on a mobile device can prompt a user to select a display if more than one display is within range.

The architecture of the present disclosure may provide significant advantages, some of which have already been briefly mentioned. For example, WiFi access points are becoming pervasive and a mobile device can use them to readily access the enhanced network services of network environment 100. WiFi implementations of the present disclosure can also provide increased accuracy of proximity detection, particularly for indoor applications. However, the present disclosure is readily extensible to other wireless technologies (e.g., Bluetooth, Near Field Communications, WiMAX, 3G, 4G, etc.) and other location technologies (e.g., GPS, 3G positioning, etc.). Stated more directly, the present disclosure is not limited by the use of WiFi as the proximity detection piece, where WiFi only represents one of the many possibilities to be used in conjunction with the present disclosure.

Note that the architecture of the present disclosure may be particularly advantageous in airports, tourist destinations (e.g., Disneyland), and other venues where many languages may be spoken in a concentrated area. Moreover, the advantages and benefits of the present disclosure are not confined to limiting alternate language content. The architecture of the present disclosure may also be advantageous for providing other types of alternate content, such as for delivering customized content based on sponsorship. For example, amusement parks or similar venues are frequently used for special group events, and alternate content may be provided based on proximity of displays to group members.

The architecture of the present disclosure can also provide rich opportunities for sending content to a mobile device without regard to custom language settings. Moreover, additional usage metrics can be acquired, such as how long a person stood in front of an output device, how long content was displayed on a mobile device, and which content has been viewed previously. By tracking which content has been viewed previously, network environment 100 can control delivery of content so that only unviewed content is delivered to an output device (e.g., a video monitor or a mobile device). Additional interactive links may also be included with content delivered to a mobile device that can further enhance tracking and interaction capabilities.

In example embodiments, at least some portions of the activities outlined herein may be implemented in non-transitory logic (i.e., software) provisioned in, for example, mobile device 130, DMS 120, and/or anywhere within wireless location service system 110. This can include one or more instances of location identifier 370 and/or mobility services engine 240 being provisioned in various components and/or locations of the network. In some embodiments, one or more of these features may be implemented in hardware, provided external to these elements, or consolidated in any appropriate manner to achieve the intended functionality. Mobile device 130, DMS 120, and/or wireless location service system 110 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, components of the present disclosure described and shown herein may also include suitable interfaces for receiving, transmitting, and/or otherwise communicating data or information in a network environment. Additionally, some of the processors and memory associated with the various nodes may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory associated with mobile device 130 and/or wireless location service system 110) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, one or more processors associated with mobile device 130 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Additionally, any of the components of the present disclosure can include one or more memories (e.g., memory associated with mobile device 130) for storing information to be used in achieving operations as outlined herein. These devices may further keep information in any suitable type of memory element (e.g., RAM, ROM, FPGA, EPROM, EEPROM, etc.), software, hardware, or in any other suitable component, device, element, or object where appropriate and based on particular needs. The information being tracked, sent, received, or stored in the present disclosure could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that architecture the present disclosure (and its teachings) are readily scalable and can accommodate a large number of components, as well as more complicated/sophisticated arrangements and configurations. Accordingly, the examples provided should not limit the scope or inhibit the broad teachings of architecture of the present disclosure, as potentially applied to a myriad of other architectures. Additionally, although described with reference to particular scenarios, where a particular software module is provided within a network element, these modules can be provided externally, or consolidated and/or combined in any suitable fashion. In certain instances, such modules may be provided in a single proprietary unit.

It is also important to note that the steps in the appended diagrams illustrate only some of the possible signaling scenarios and patterns that may be executed by, or within, network environment 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a location update indicative of a position of a mobile device;
    determining a proximity of the mobile device to an anchor location based on the position, wherein the anchor location is associated with a location of an output device for delivering content;
    identifying a preference associated with the mobile device; and
    sending content to the output device based on the preference and the proximity.

2. The method of claim 1, wherein the output device is a display and the content is sent to the display if the proximity indicates that the mobile device is within a viewing area of the display.

3. The method of claim 1, wherein the preference is a preferred language and the content is sent to the output device in the preferred language.

4. The method of claim 1, wherein the anchor location is a digital media system (DMS) and the output device is a display configured to provide digital advertising.

5. The method of claim 1, wherein the content is provided as a Resource Description Framework (RDF) Site Summary (RSS) feed to the mobile device.

6. The method of claim 1, wherein a compass is used to select one of a plurality of displays within range of the mobile device, and wherein a quick response code provided to the mobile device is used to distinguish the plurality of displays within range.

7. The method of claim 1, further comprising:
    pushing a notification to the mobile device that the content is available in an alternate language.

8. The method of claim 1, further comprising:
    determining a plurality of mobile devices are within range of the anchor location; and
    determining a majority language preference associated with the plurality of mobile devices for delivering the content via the output device.

9. One or more non-transitory media encoded with logic that includes code for execution and when executed by one or more processors is operable to perform operations comprising:
    receiving a location update indicative of a position of a mobile device;
    determining a proximity of the mobile device to an anchor location based on the position, wherein the anchor location is associated with a location of an output device for delivering content;
    identifying a preference associated with the mobile device; and
    sending content to an output device based on the preference and the proximity.

10. The non-transitory media of claim 9, wherein the output device is a display and the content is sent to the display if the proximity indicates that the mobile device is within a viewing area of the display.

11. The non-transitory media of claim 9, wherein the preference is a preferred language and the content is sent to the output device in the preferred language.

12. The non-transitory media of claim 9, wherein the anchor location is a digital media system (DMS) and the output device is a display configured to provide digital advertising.

13. The non-transitory media of claim 9, wherein the content is provided as a Resource Description Framework (RDF) Site Summary (RSS) feed to the mobile device.

14. The non-transitory media of claim 9, wherein a compass is used to select one of a plurality of displays within range of the mobile device, and wherein a quick response code provided to the mobile device is used to distinguish the plurality of displays within range.

15. An apparatus, comprising:
    a memory;
    a processor coupled to the memory; and
    a mobility services engine coupled to the processor, wherein the apparatus is configured for:
        receiving a location update indicative of a position of a mobile device;
        determining a proximity of the mobile device to an anchor location based on the position, wherein the anchor location is associated with a location of an output device for delivering content;
        identifying a preference associated with the mobile device; and sending content to an output device based on the preference and the proximity.

16. The apparatus of claim 15, wherein the output device is a display and the content is sent to the display if the proximity indicates that the mobile device is within a viewing area of the display.

17. The apparatus of claim 15, wherein the preference is a preferred language and the content is sent to the output device in the preferred language.

18. The apparatus of claim 15, further comprising:
a content server configured to provide the content as a Resource Description Framework (RDF) Site Summary (RSS) feed to the mobile device.

19. The apparatus of claim 15, wherein the apparatus is further configured for:
pushing a notification to the mobile device that the content is available in an alternate language.

20. The apparatus of claim 15, wherein the apparatus is further configured for:
determining a plurality of mobile devices are within range of the anchor location; and
determining a majority language preference associated with the plurality of mobile devices for delivering the content via the output device.

* * * * *